Dec. 29, 1970     M. GLOWA     3,551,061
INSTRUMENT FOR AND METHOD OF OPTICAL WORK INSPECTION
Filed July 26, 1967     3 Sheets-Sheet 1
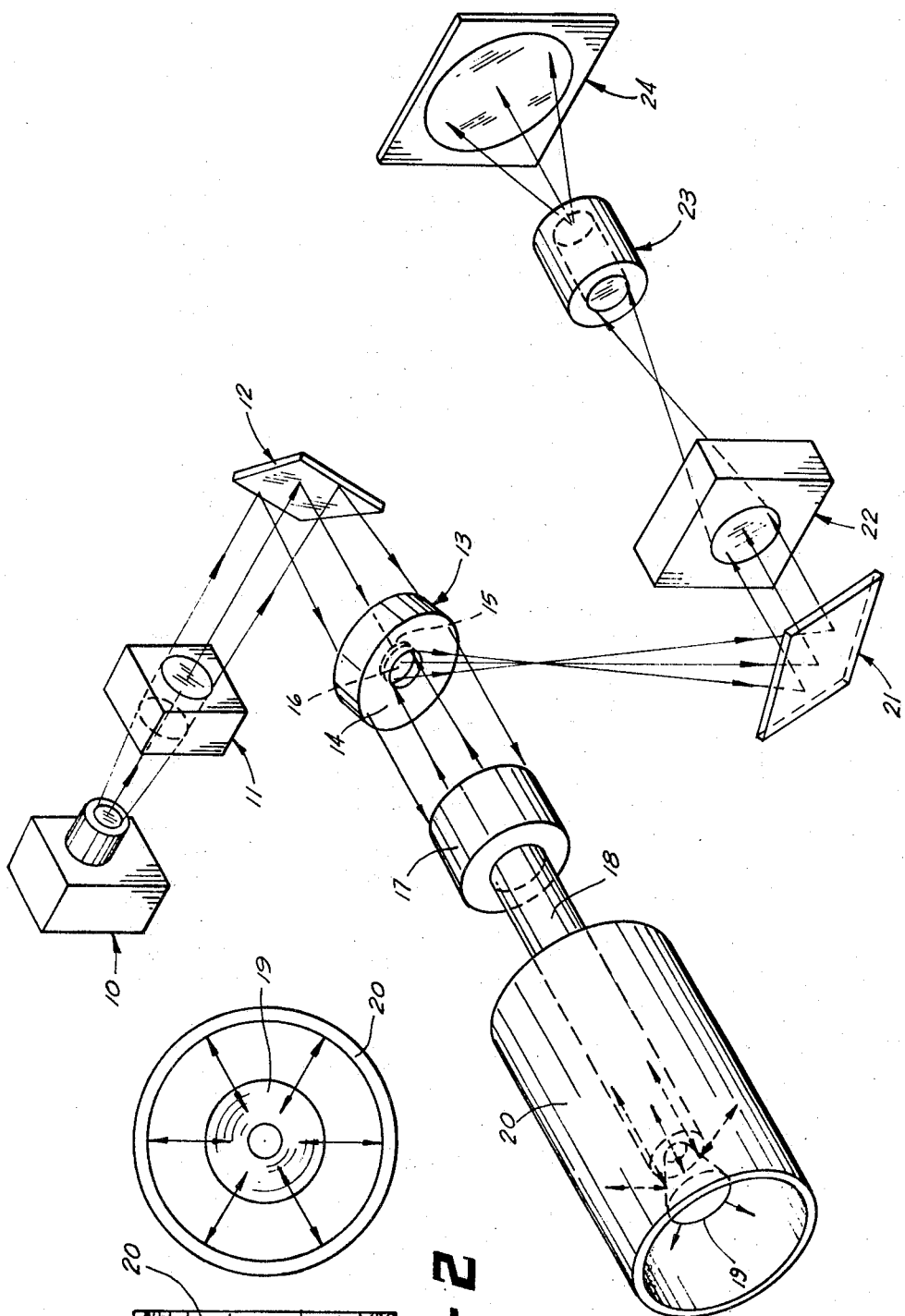
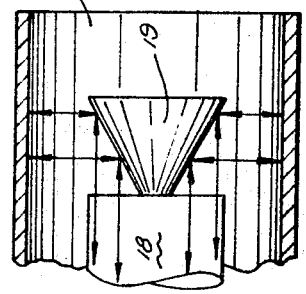
INVENTOR.
MICHAEL GLOWA
BY Stephen E. Rockwell
ATTORNEY

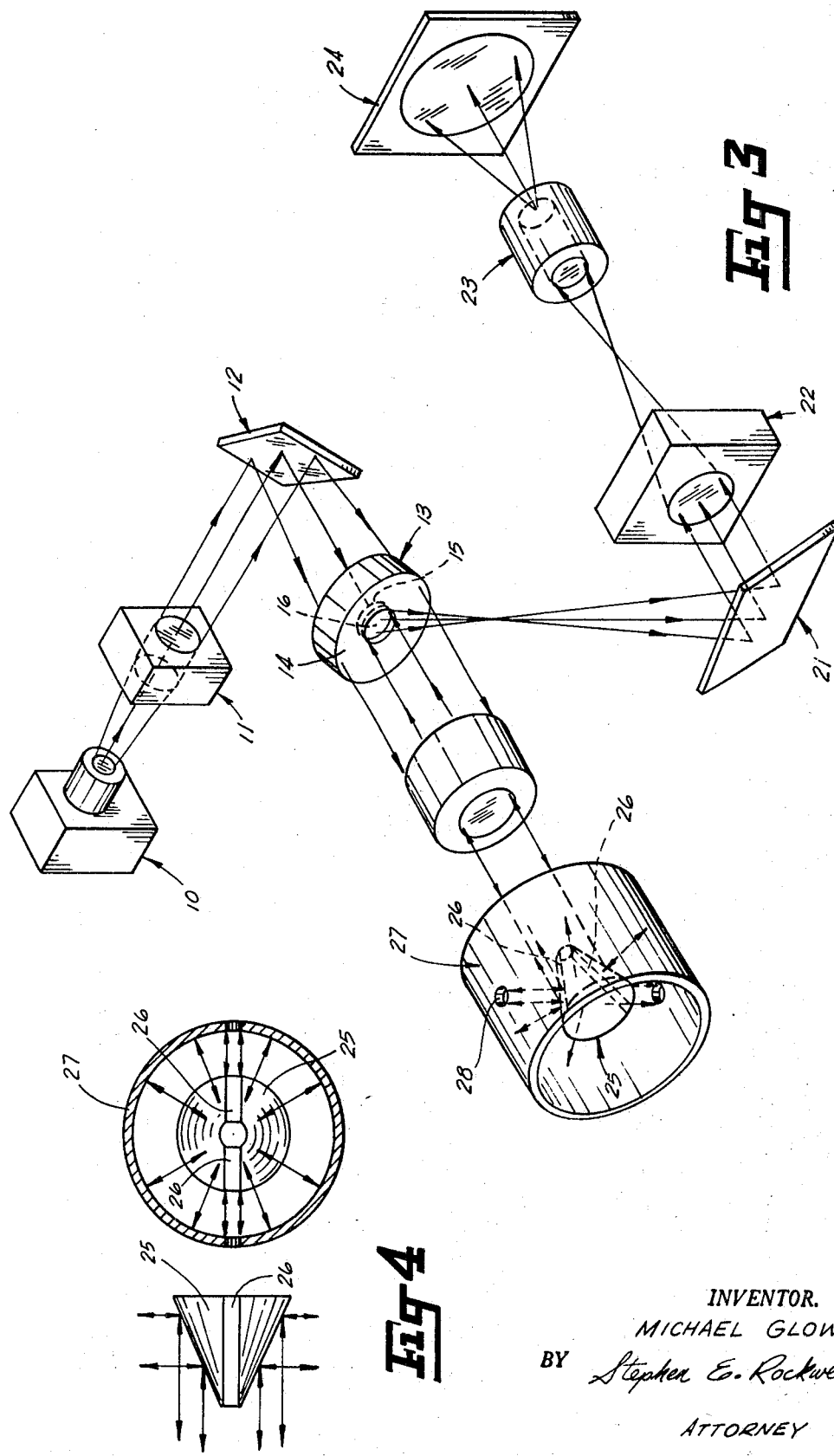

United States Patent Office 3,551,061
Patented Dec. 29, 1970

3,551,061
INSTRUMENT FOR AND METHOD OF OPTICAL WORK INSPECTION
Michael Glowa, Springfield, Vt., assignor to Textron Inc., Providence, R.I., a corporation of Delaware
Filed July 26, 1967, Ser. No. 656,097
Int. Cl. G01n 21/16
U.S. Cl. 356—241                 6 Claims

ABSTRACT OF THE DISCLOSURE

This disclosure pertains to an optical instrument and technique, especially useful in a comparator employing a lens system and a viewing screen, for projecting light on an internal surface of means defining a bore, for example, and retrieving a reflected image of the surface and any transverse openings in said means, for inspection. They are particularly useful for inspecting cavities or bores and permit viewing at one time of 360° of an axial part of an internal surface of a bore by projecting the magnified image on a screen in the form of an annulus.

---

This invention relates to an instrument for and method of optical work inspection. The instrument employs a lens system especially useful in a comparator having a viewing screen which may be illuminated. The technique and instrument are well adapted for inspection of internal surface detail of means defining both open-ended bores and blind holes or cavities, which may be of a relatively short or long axial dimension. The instrument and technique permit viewing at one time of an entire axial part (360°) of an internal surface of a bore, for example. It is believed that heretofore this has not been possible, and that only a portion of a circle, for example, defined by a surface could be viewed, that is, an arcuate surface portion, at one time, one after another. Moreover, in addition to permitting the inspection of an internal cyilndrical surface such as a bore for flaws such as scratches or lack of uniformity, the instrument and technique permit inspection for the angular location of grooves in the internal surface and openings in the cylindrical wall structure providing the aforementioned surface. Such grooves or openings may be inspected also for ascertaining whether or not such grooves or openings are of the desired shape and/or dimensions. Tolerance lines may be provided on the screen for this purpose. The lens system and technique employed project light from a source on an internal surface of means defining the surface through the lens system and retrieve the reflected image of the surface and any transverse openings in the last-named means, for projection in magnified form on the screen for inspection.

One object of the invention is to provide an improved instrument for optical work inspection of an internal surface of work, such as a bore or cavity, and which is well suited for employment in a comparator having a viewing screen.

Another object is to provide an instrument such as that characterized above which permits viewing at one time of 360° of an axial part of the internal bore surface, for example, producing an annulus on the viewing screen, tending to permit faster work inspection.

A further object is to provide an instrument which permits inspection for the angular location of grooves in the internal surface or transverse openings in the cylindrical wall structure of a bore, for example, and also permits such grooves or openings to be inspected for ascertaining whether or not they are of the desired shape and/or dimensions, which instrument simultaneously permits inspection for flaws such as scratches in the internal surface or nonuniformity therein. A further object of the invention is to provide an instrument such as characterized above, for the inspection of both open-ended bores or blind holes or cavities which may be of a relatively short or long axial dimension.

Still another object of the invention is to provide a technique for improved optical work inspection such as characterized above.

In the drawings:

FIG. 1 is a diagrammatic view of the principal elements of an optical work inspection instrument embodying the invention, illustrating the same isometrically, showing work being inspected;

FIG. 2 is an enlarged fragmentary view illustrating the operation of the instrument both from one side and as viewed from one end, in association with work being inspected;

FIG. 3 is a view similar to FIG. 1 but illustrating a modified form of the instrument;

FIG. 4 is an enlarged view, similar to FIG. 2, illustrating the manner of operation of the instrument of FIG. 3.

Figure 5:
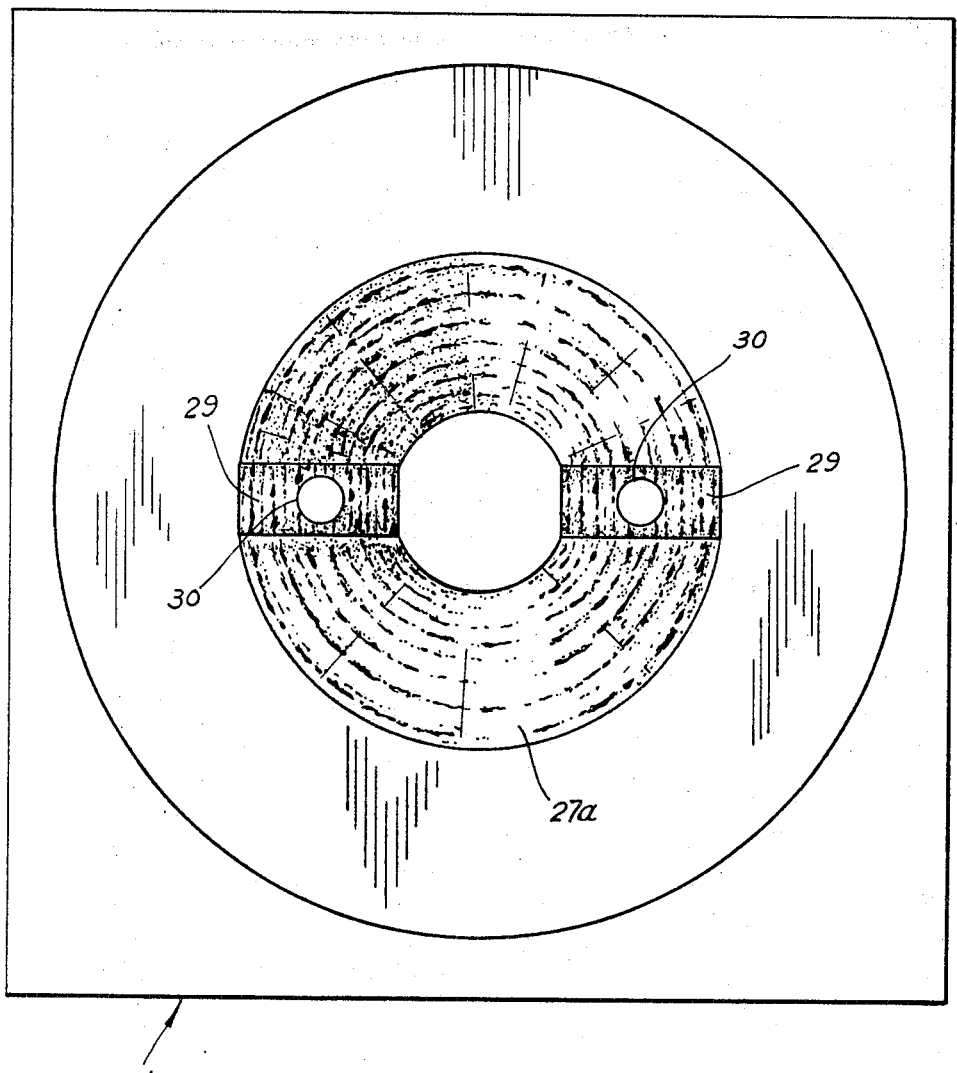
FIG. 5 is an enlarged view of the viewing screen shown in the drawings illustrating an image projected thereon by the instrument of FIG. 3.

There is shown in the drawings diagrammatically and by way of example a light source which may take the form of a mercury-arc lamp in a housing in combination with a lens, all indicated generally at 10. Light from this source is directed in the form of a beam through the lens of the unit to a condensing lens device indicated generally at 11, from which light is directed, as shown by the arrows, for reflection by a mirror element 12 arranged at a 45° angle with reference to the axis of the lens device 11 so as to reflect light at a 90° angle, also as indicated by the arrows. Light reflected from the mirror element 12 is directed upon a lens device indicated generally at 13.

The last-mentioned device comprises an annular lens 14 constructed of glass or other suitable material to transmit light. The central opening of the annular lens 14 on the side toward the mirror element 12 is closed, as at 15, by means provided an opaque surface while the opposite side is closed, as at 16, by means providing a mirror finish. The aforementioned opaque surface is disklike, and the aforementioned mirror surface is of a similar size and shape. The mirror finish previously referred to may be formed by a polished aluminized material suitably supported. It will be understood that the opaque surface may be formed by any conventional material suitably supported.

The lens device 13 is arranged at a 45° angle on an axis transverse to the passage of the light reflected from the mirror element 12 and, as shown, is tipped away from the mirror element. Light reflected from the mirror element 12 is transmitted through the annular lens 14. It will be understood from the foregoing that light from the mirror element 12 cannot pass through the center of the lens element 13. Light transmitted through the annular lens 14 passes to a front erector lens 17. The last-mentioned lens has a focusing function.

In the form shown in FIG. 1, the erector lens 17 has affixed in the center thereof and extending therefrom at the side remote from the lens device 13 a light-transmitting rod 18 formed of glass or other suitable light-carrying material which extends beyond the focal plane of the erector lens 17. The function of this rod 18, which is of smaller diameter than the lens 17 and is concentrically arranged with respect thereto, is to carry light from the lens 17 into a deep bore or cavity of a depth greater than the focal plane of the lens 17.

Concentrically supported on the distal end of the rod 18 is a light-reflecting element 19 in the form of a truncated cone having a base of substantially the same diameter as the rod 18, the small end of the truncated cone being nearest the distal end of the rod 18. The cone is formed of a material to support a coating providing a mirror finish. This mirror finish may be formed of the same material forming the mirror surface 16. In the form of FIG. 1 the reflecting element 19 and the rod 18 are shown extending into a hollow cylinder 20, the internal surface of which is to be inspected. The cylinder may be of a substantial axial dimension and, while it is shown as being open at both ends, it is to be understood that it may be closed at the end farthest from the erector lens 17 so as to provide a cylinder having a blind hole or bore, open only at one end. The interior of the cylinder 20 may also be considered a cavity. It will be appreciated from the foregoing that the cylinder 20 constitutes the work or workpiece.

Light carried by the rod 18 in a direction away from the front erector lens 17 is transmitted to the conical mirror surface of the element 19, from which it is reflected radially outwardly in all directions substantially along its length toward the internal surface portion of the work 20 axially opposite to be inspected, as indicated by the arrows. Also as indicated by the arrows, the image of the surface portion, approximately equal in length to the axial dimension of the element 19, is reflected back thereupon by the internal surface of the work 20, as best shown in FIG. 2. Light is then transmitted, as shown in the last-mentioned view, back along the rod 18 from the reflecting element 19 through the center of the erector lens 17 and is directed upon the mirror surface 16 of the lens device 13.

As this surface 16 is inclined at a 45° angle, as previously indicated, it reflects light at a 90° angle therefrom, which light is directed upon a mirror element 21 inclined at a 45° angle to bend light reflected therefrom at a 90° angle in the direction of a rear erector lens 22. Light from the rear erector lens 22, again as shown by the arrows, is directed to a projection lens 23 which has a magnifying function and which projects upon a suitable screen, indicated at 24, the magnified image of the portion of the internal surface of the work 20 which appears on the screen 24 as an annulus similar but not identical to that shown in FIG. 5. It will be understood from the foregoing that the aforementioned annulus projected on the screen is a reproduction of 360° of the internal surface of the workpiece, that is, an axial portion thereof which may be viewed at one or the same time or simultaneously for inspection purposes and that axial portions of the internal surface of the workpiece may be sequentially viewed by relative movement of the reflecting cone 19 axially thereof with reference to the workpiece. In this manner light may be transmitted from a source to a remote point at which an image is created, which image is retrieved and projected in magnified form on a suitable screen for inspection. Flaws such as scratches in the reflecting surface of the work or nonuniformity of this surface may be detected.

In the form of FIGS. 1 and 2 the work being inspected has no openings in the cylindrical wall structure thereof or grooves formed in the internal surface of the work. To examine the internal surface throughout its axial dimension the work may be supported for movement axially of the conelike element 19, not shown.

In the form illustrated in FIGS. 3, 4 and 5 no elongation of the focal plane of the front erector lens is required and none is shown. Therefore, a focal plane elongator similar to the rod 18 is not employed but the instrument is in other respects similar to that shown in FIG. 1, with the exception of the reflecting cone element which takes a different form from that shown in FIG. 1 and indicated at 19, inasmuch as the work shown being inspected in FIG. 3 is of a different type from that shown in FIG. 1.

The cone element 25 may be truncated in a manner similar to the aforementioned lens element 19 of the instrument of FIG. 1. The cone element has its smaller end located nearest the front erector lens 17 but spaced therefrom so that the surface of the cone lies in the focal plane of the lens 17.

The element 25 may be suitably supported, as from its base, in a manner not shown, and is provided with two diametrically opposite flats 26 which extend lengthwise of the axis of the element 25 from one end of the element 25 to the other. Otherwise the element 25 may be considered a true truncated cone and, when provided with flats, such as the flats 26, may be considered conelike in appearance and may be referred to hereinafter as being a cone. The element 25, like the previously described reflecting element 19, is coated with a light-reflective material throughout its circumference from end to end, the reflective material overlying the flats 26. The light-reflecting cone element 25 is shown to advantage in FIG. 4.

The work 27 may be considered as having a relatively short axial opening therein and, as shown in FIGS. 3 and 4, is in the form of a hollow cylinder having transverse openings 28 therein which are two in number and diametrically opposed to one another. The flats on the cone element are predetermined in size (width), number, and angular location in accordance with the size, number, and angular location of the openings in the work specifications. It should be understood that the work may have, instead of holes formed in the cylindrical wall structure thereof, grooves (not shown) in the internal surface thereof. The work 27 is so supported during inspection that it may be rotated as well as moved axially, and, if the work has been properly formed, that is, with the holes 28 in proper relation to one another. The work may be rotated to a position in which the holes 28 will be in alignment axially thereof with points along the respective flats 26 of the lens element 25.

Light is directed from the front erector lens 17, as in the first-described form, on the reflective surface of the reflecting element 25 and, as in the first-mentioned form, the arcuately formed surfaces of the element 25 reflect light therefrom radially, as shown by the arrows in FIGS. 3 and 4. However, light rays directed on the flats 26 by the erector lens 17 are reflected therefrom not radially, but in parallelism with one another in the manner best shown in FIG. 4. When the work is properly positioned with reference to the element 25 these parallel light rays reflected from the element 25 in opposite directions, as shown in the lastmentioned view, strike the area of the work around the holes 28 and are reflected from these surfaces back upon the flats 26, as indicated by the arrows, in a manner tending to reflect the image of the holes 28 without distortion. Otherwise, that is without the flats, the reflected images of the holes would appear elliptical.

The image thus created of the internal surface and the openings in the cylindrical wall structure is retrieved in the same manner in which the image is retrieved in the instrument of FIG. 1 (but without the glass rod) and projected on a screen such as the screen shown in FIG. 5 and indicated at 24. The image 27a of the axial portion of the internal surface of the work 27 appears, as shown in FIG. 5, as an annulus. Here again flaws in the surface of the work reflecting light may be detected. The portions of the image created by the flats 26 on the reflecting element 25 appear, as at 29, on the screen, and the holes 28 in the work 27 appear, as at 30. Any burring, for example, of the holes 28 tends to appear on the screen 24 or any other imperfections in openings or grooves formed in the internal surface. Tolerance lines, not shown, may be provided on the screen to indicate to the viewer whether or not openings such as the holes 28 in the work are located correctly in angular positions with respect to one another and also whether or not the holes are within the required tolerances with respect to their dimensions. As previously indicated, the shape of any opening or groove in the internal surface is readily apparent on the screen. The word "opening," as used in the appended claims, may be construed to cover, as well as a through opening in the cylindrical wall structure of a hollow cylinder, for example, a groove in the internal surface thereof or a transverse cavity communicating with the interior of the cylinder. It will also be apparent that in the use of the instrument with the work illustrated in FIG. 1 wherein the work has no transverse openings therein nor internal grooves or cavities, the projected image on the screen does not have, with reference to FIG. 5, the portions 29 nor the outlines of holes 30 or their equivalents.

The method embodying the invention comprises the several steps and their relation to each other in projecting light from a source on an internal light-reflecting surface of means defining this surface, creating an image of this surface for retrieval, and retrieving the image for viewing and inspection in magnified form. As indicated, the technique permits viewing and inspection, at one time, of a 360° surface portion of a bore or cavity and may also permit viewing and inspection of transverse openings or grooves in the wall structure of the work. Thus the stated objects of the invention are attained.

While only two forms of the invention have been illustrated in the drawings and described above, it will be understood by those versed in the art that it may take other forms and is susceptible of various changes in details without departing from the principles of the invention and the scope of the appended claims.

What is claimed is:

1. An optical instrument for inspecting a light-reflective internal wall surface of a cavity in a workpiece comprising means generating a beam of light at a location remote from the workpiece, means for transmitting said beam entirely around at least an axial part of said surface and creating a ringlike image of the latter, and means to retrieve said image in a form for viewing at a location remote from the workpiece, said light-transmitting means and said image-retrieving means having in common a lens device comprising an annular lens element to transmit light in a direction for subsequent impingement on said surface portion, and having its center closed on the downstream side thereof by a mirror element reflecting the image on its retrieval, the mirror element being arranged at an angle to the axis of the cavity to reflect the image to said location remote from the workpiece for viewing.

2. An optical instrument as defined in claim 1 wherein said light-transmitting means includes an erector lens for focusing light from said beam and wherein there is provided for inspection of a deep cavity a rod of light-transmitting material concentrically arranged with respect to said lens to transmit light within the cavity beyond the focal plane of said lens.

3. An optical instrument for inspecting a light-reflective internal wall surface of a cavity in a workpiece comprising means generating a beam of light at a location remote from the workpiece, means for transmitting said beam entirely around at least an axial part of said surface and creating a ringlike image of the latter, and means to retrieve said image in a form for viewing at a location remote from the workpiece, said means for transmitting light to said part of said workpiece surface and creating the image comprising a light-reflective cone positioned in the cavity from which light is reflected radially on at least a part of said workpiece surface from the cone and the cone receives light reflected radially from the said workpiece surface to create at least a portion of the image, said light-transmitting means and said image-retrieving means having in common a lens device comprising an annular lens element to transmit light in a direction for subsequent impingement on said cone and having its center closed on the downstream side thereof by a mirror element reflecting the image on its retrieval, the mirror element being aranged at an angle to the axis of the cavity to reflect the image to said location remote from the workpiece for viewing.

4. An optical instrument for inspecting a light-reflective internal wall surface of a cavity in a workpiece comprising means generating a beam of light at a location remote from the workpiece, means for transmitting said beam entirely around at least an axial part of said surface and creating a ringlike image of the latter, and means to retrieve said image in a form for viewing at a location remote from the workpiece, said means for transmitting light to said part of said surface and creating the image comprising a light-reflective cone in the cavity from which light is reflected radially on at least a part of said surface throughout at least a portion of the periphery of the cone, which portion of the cone receives light reflected radially from the workpiece to create at least a portion of the image, said cone having at least one flat surface on the periphery thereof which may be aligned with a transverse opening in the workpiece to reflect as part of the image the size and shape of the last-mentioned opening.

5. An optical instrument for inspecting a light-reflective internal wall surface of a cavity in a workpiece comprising means generating a beam of light at a location remote from the workpiece, means for transmitting said beam entirely around at least an axial part of said surface and creating a ringlike image of the latter, means to retrieve said image in a form for viewing at a location remote from the workpiece, said means for transmitting light to said part of said surface and creating the image comprising a light-reflective cone in the cavity from which light is reflected radially on at least a part of said surface throughout at least a portion of the periphery of the cone, which portion of the cone receives light reflected radially from said surface to create at least a portion of the image, means for magnifying the retrieved image, a screen having tolerance lines theron, and means for projecting the magnified image on said screen, said cone having at least two flat surfaces on the periphery thereof which may be aligned with respective transverse openings in the workpiece, the angular locations of the transverse openings being viewable with reference to the tolerance lines on the screen, which screen also indicates the size and shape of the last-mentioned openings.

6. An optical instrument for inspecting a light-reflective internal wall surface of a cavity in a workpiece comprising means generating a beam of light at a location remote from the workpiece, means for transmitting said beam entirely around at least an axial part of said surface and creating a ringlike image of the latter, and means to retrieve sid image in a form for viewing said surface at a location remote from the workpiece, said means for transmitting light to said part of said surface and creating the image comprising a light-reflective cone in the cavity from which light is reflected radially on at least a part of said surface throughout at least a portion of the periphery of the cone which portion of the cone receives light reflected radially from the said surface to create at least a portion of the image, said cone having at least two flat surfaces on the periphery thereof which may be aligned with respective transverse openings in the workpiece, whereby the angular locations of the transverse openings may be viewed.

References Cited

UNITED STATES PATENTS

| | | | |
|---|---|---|---|
| 2,518,240 | 8/1950 | Lowber | 350—9UX |
| 3,221,593 | 12/1965 | Ferris | 356—241 |
| 3,329,059 | 7/1967 | McCormac | 356—241 |
| 3,355,981 | 12/1967 | Baker | 350—49UX |
| 3,413,067 | 11/1968 | Froio | 356—241 |

FOREIGN PATENTS

| | | |
|---|---|---|
| 110,148 | 6/1924 | Switzerland. |

RONALD L. WIBERT, Primary Examiner

O. B. CHEW II, Assistant Examiner